US010216479B2

(12) United States Patent
Lutz et al.

(10) Patent No.: US 10,216,479 B2
(45) Date of Patent: Feb. 26, 2019

(54) APPARATUS AND METHOD FOR PERFORMING ARITHMETIC OPERATIONS TO ACCUMULATE FLOATING-POINT NUMBERS

(71) Applicant: ARM Limited, Cambridge (GB)

(72) Inventors: David Raymond Lutz, Austin, TX (US); Neil Burgess, Cardiff (GB); Christopher Neal Hinds, Austin, TX (US); Andreas Due Engh-Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 58 days.

(21) Appl. No.: 15/370,660

(22) Filed: Dec. 6, 2016

(65) Prior Publication Data

US 2018/0157464 A1 Jun. 7, 2018

(51) Int. Cl.
  *G06F 7/483* (2006.01)
  *G06F 9/30* (2018.01)
  *G06F 7/499* (2006.01)

(52) U.S. Cl.
  CPC .......... *G06F 7/483* (2013.01); *G06F 7/49915* (2013.01); *G06F 9/3001* (2013.01);
  (Continued)

(58) Field of Classification Search
  CPC .................................................. H03M 7/24
  See application file for complete search history.

(56) References Cited

U.S. PATENT DOCUMENTS

| | | | |
|---|---|---|---|
| 8,977,669 B2* | 3/2015 | Chen ..................... | G06F 9/3885 708/495 |
| 2005/0125641 A1* | 6/2005 | Ford .................. | G06F 9/30025 712/225 |

(Continued)

FOREIGN PATENT DOCUMENTS

WO    WO 2016/071666    5/2016

OTHER PUBLICATIONS

IBM PowerPC 750CL RISC Microprocessor User's Manual, Aug. 8, 2007.*

(Continued)

*Primary Examiner* — Matthew D Sandifer
*Assistant Examiner* — Emily E Larocque
(74) *Attorney, Agent, or Firm* — Nixon & Vanderhye PC

(57) ABSTRACT

An apparatus and method are provided for performing arithmetic operations to accumulate floating-point numbers. The apparatus comprises execution circuitry to perform arithmetic operations, and decoder circuitry to decode a sequence of instructions. A convert and accumulate instruction is provided, and the decoder circuitry is responsive to decoding the convert and accumulate instruction to generate one or more control signals to control the execution circuitry to convert at least one floating-point operand identified by the convert and accumulate instruction into a corresponding N-bit fixed-point operand having M fraction bits, where M is less than N and M is dependent on a format of the floating-point operand. The execution circuitry accumulates each corresponding N bit fixed-point operand and a P bit fixed-point operand identified by the convert and accumulate instruction in order to generate a P bit fixed-point result value, where P is greater than N and also has M fraction bits.

18 Claims, 7 Drawing Sheets

(52) U.S. Cl.
CPC ...... *G06F 9/30014* (2013.01); *G06F 9/30025* (2013.01); *G06F 9/30036* (2013.01)

(56) References Cited

U.S. PATENT DOCUMENTS

2007/0220076 A1   9/2007   Hinds
2011/0173421 A1   7/2011   Chen et al.

OTHER PUBLICATIONS

International Search Report and Written Opinion of the International Searching Authority dated Jan. 22, 2018 in PCT/GB2017/053163, 21 pages.
M. Muller et al, "Exact Accumulation of Floating-Point Numbers" *Proceedings, 10$^{th}$ IEEE Symposium on Computer Arithmetic*, Jun. 26, 1991, pp. 64-69.
Miranker, Willard, "Systolic Super Summation with Reduced Hardware", Mathematical Sciences Department IBM T.J. Watson Research Center, Aug. 6, 2002, 11 pages.

* cited by examiner

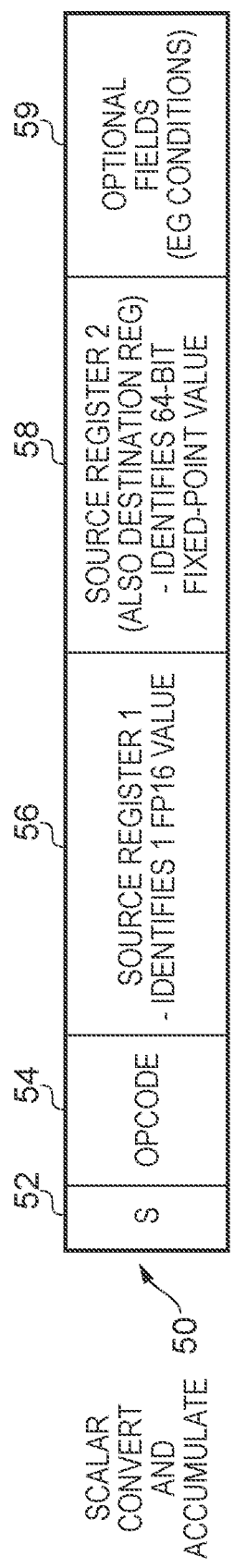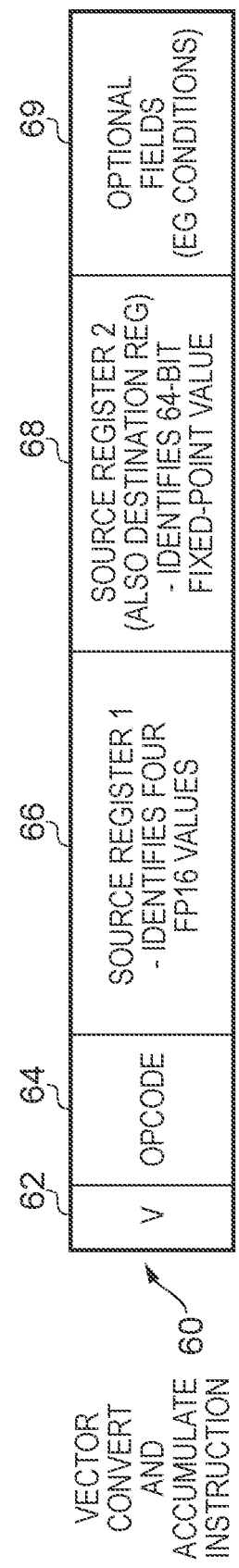

APPARATUS AND METHOD FOR PERFORMING ARITHMETIC OPERATIONS TO ACCUMULATE FLOATING-POINT NUMBERS

BACKGROUND

The present technique relates to and apparatus and method for performing accumulation of floating-point numbers.

It is common to use floating-point (FP) representation in data processing systems. A floating-point number includes a significand and an exponent indicating a significance of the bits of the significand. This allows numeric values over a large range to be represented using a finite number of bits. However, a problem with floating-point arithmetic is that calculations are generally non-associative. For example, when accumulating several floating-point values, each time another value is added to, or subtracted from, the result of the previous addition/subtraction, the result is rounded and normalised, which means that the overall result is different depending on the order in which the values are accumulated. Hence, sums are not reproducible unless completed in the exact same order. To generate a reproducible result, a series of additions or subtractions typically have to be performed sequentially, which can make floating-point arithmetic relatively slow It would be desirable to provide an improved technique for efficiently handling accumulation of floating-point numbers.

SUMMARY

In one example configuration, an apparatus is provided comprising: execution circuitry to perform arithmetic operations; and decoder circuitry to decode a sequence of instructions in order to generate control signals to control the arithmetic operations performed by the execution circuitry; the decoder circuitry being responsive to decoding a convert and accumulate instruction within the sequence to generate one or more control signals to control the execution circuitry to convert at least one floating-point operand identified by the convert and accumulate instruction into a corresponding N-bit fixed-point operand having M fraction bits, where M is less than N and M is dependent on a format of the floating-point operand, and to accumulate each corresponding N-bit fixed-point operand and a P-bit fixed-point operand identified by the convert and accumulate instruction in order to generate a P-bit fixed-point result value, where P is greater than N and has M fraction bits.

In another example configuration there is provided a method of performing accumulation of floating-point numbers within an apparatus having execution circuitry to perform arithmetic operations, and decoder circuitry to decode a sequence of instructions in order to generate control signals to control the arithmetic operations performed by the execution circuitry, the method comprising: decoding within the decoder circuitry a convert and accumulate instruction within the sequence to generate one or more control signals; and controlling the execution circuitry in response to said one or more control signals to convert at least one floating-point operand identified by the convert and accumulate instruction into a corresponding N-bit fixed-point operand having M fraction bits, where M is less than N and M is dependent on a format of the floating-point operand, and to accumulate each corresponding N-bit fixed-point operand and a P-bit fixed-point operand identified by the convert and accumulate instruction in order to generate a P-bit fixed-point result value, where P is greater than N and has M fraction bits.

In a yet further example configuration there is provided an apparatus comprising: execution means for performing arithmetic operations; and decoder means for decoding a sequence of instructions in order to generate control signals to control the arithmetic operations performed by the execution means; the decoder means for decoding a convert and accumulate instruction within the sequence in order to generate one or more control signals; and the execution means for converting, in response to said one or more control signals, at least one floating-point operand identified by the convert and accumulate instruction into a corresponding N-bit fixed-point operand having M fraction bits, where M is less than N and M is dependent on a format of the floating-point operand, and for accumulating each corresponding N-bit fixed-point operand and a P-bit fixed-point operand identified by the convert and accumulate instruction in order to generate a P-bit fixed-point result value, where P is greater than N and has M fraction bits.

BRIEF DESCRIPTION OF THE DRAWINGS

The present technique will be described further, by way of example only, with reference to embodiments thereof as illustrated in the accompanying drawings, in which:

FIGS. 2A and 2B schematically illustrate convert and accumulate instructions used in one embodiment;

DESCRIPTION OF EMBODIMENTS

Figure 1:
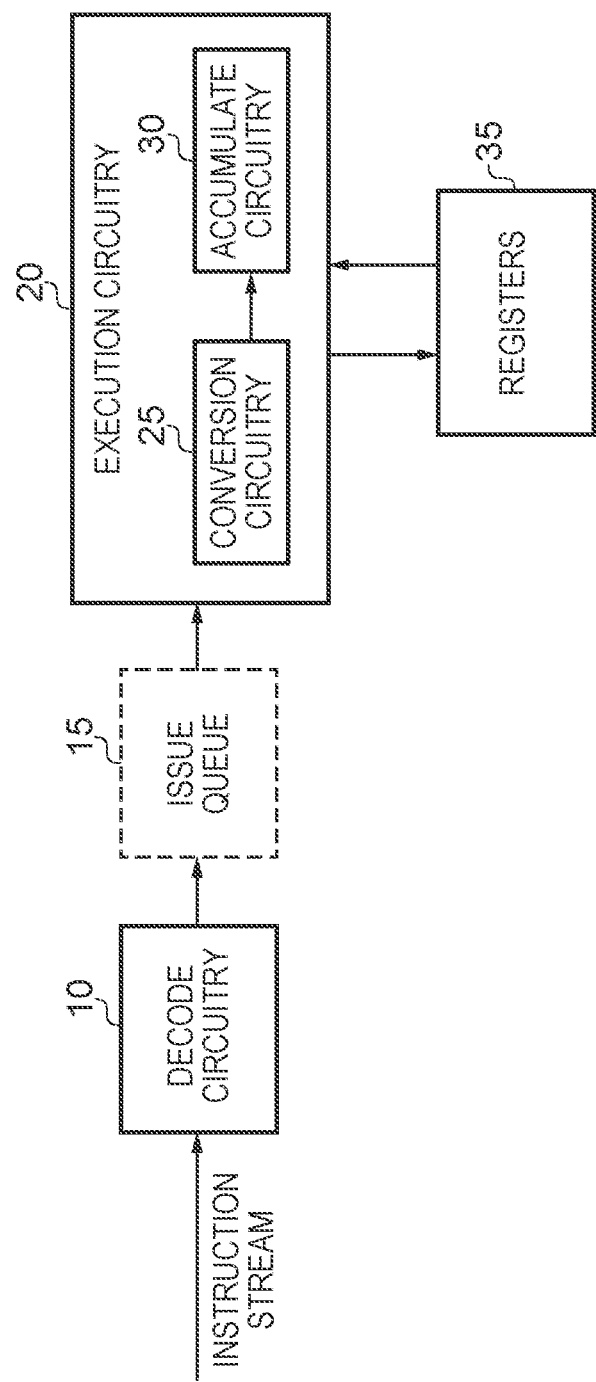
FIG. 1 is a block diagram of a system in accordance with one embodiment.

Before discussing the embodiments with reference to the accompanying figures, the following description of embodiments is provided.

In one embodiment an apparatus is provided that has execution circuitry for performing arithmetic operations, and decoder circuitry for decoding a sequence of instructions in order to generate control signals to control the arithmetic operations performed by the execution circuitry, thereby causing the apparatus to perform the operations required by the sequence of instructions. In accordance with one embodiment, a convert and accumulate instruction is provided which, when encountered by the decoder circuitry within the instruction sequence, causes the decoder circuitry to decode that convert and accumulate instruction in order to generate one or more control signals for the execution circuitry. In particular, those or one control signals cause the execution circuitry to convert at least one floating-point operand identified by the convert and accumulate instruction into a corresponding N-bit fixed-point operand having M fraction bits. M is less than N, and M is dependent on the format of the floating-point operand. The one or more control signals generated by the decoder circuitry not only cause the above conversion from floating-point format to fixed-point format to take place, but also cause the execution circuitry to accumulate each N-bit fixed-point operand generated during the conversion process and a P-bit fixed-point operand identified by the convert and accumulate instruction, in order to generate a P-bit fixed-point result value. P is greater than N and has M fraction bits.

Each such convert and accumulate instruction may specify one or more floating-point operands. By converting each floating-point operand into a fixed-point format, and then performing accumulation in the fixed-point format, this enables the accumulation to be performed faster than using floating-point operations, and also the accumulation is associative. Further, by accumulating the N-bit fixed-point operands with a P-bit fixed-point operand, with P being greater than N, this enables multiple N-bit fixed-point operands created by conversion of corresponding floating-point operands to be accumulated within a P-bit fixed-point representation without risk of overflow. The number of accumulations that can take place without the potential risk of any overflow will depend on the values of N and P.

Purely by way of example, if the input floating-point operands are 16-bit floating-point operands (also referred to herein as FP16 operands), any FP16 value can be represented as a fixed-point representation in 41 bits (i.e. N is 41), and if for example P is 64, $2^{23}$ of such 41-bit fixed-point values can be accumulated within a 64-bit representation without any danger of overflow. As mentioned earlier, the number of fraction bits M is dependent on the fixed-point format used. Considering again by way of example the situation where FP16 values are used, then the smallest possible FP16 value is $2^{-24}$, and hence within the 41-bit fixed-point representation the least significant 24 bits may be used as fraction bits.

By providing a single instruction to convert and accumulate floating-point values in the above described manner, this provides a particularly efficient mechanism for accumulating floating-point values in a manner that is associative, hence allowing reproducible and correct results to be generated irrespective of the order in which the floating-point numbers are accumulated. As a result, this supports parallelisation of the floating-point accumulation process, enabling significant speed-ups to be achieved when compared with using floating-point accumulation techniques.

Whilst the floating-point operands may in principle be provided in any floating-point format, it has been found that the technique is particularly beneficial when the floating-point operands are 16-bit floating-point operands. In particular, the number of bits required to represent such floating-point operands in a fixed-point format is relatively small, and significantly smaller than standard register sizes in modern data processing systems. For example, it is common to use 64-bit registers, and hence process 64-bit operands. Since FP16 values can be converted into 41-bit fixed-point representation, many such floating-point values can be accumulated within a 64-bit wide execution pipeline.

In one embodiment, the apparatus further comprises a set of registers accessible to the execution circuitry when performing said arithmetic operations. The convert and accumulate instruction may have a first register identifier field identifying at least one first source register within said set of registers, said at least one first source register containing said at least one floating-point operand, and a second register identifier field identifying a second source register within said set of registers, said second source register containing said P-bit fixed-point operand. Whilst more than one first source register may be used to identify the required floating-point operands that are to be converted into a fixed-point representation and then accumulated with the fixed-point operand in the second source register, in many instances a single first source register will be sufficient to identify the floating-point operands to be processed during execution of the instruction. For example, assuming 64-bit registers, four FP16 floating-point operands can be specified within a single 64-bit register, and hence a single instruction can be used to convert four FP16 values and accumulate the resultant fixed-point representations with the contents of the second source register.

Whilst the P-bit fixed-point result value generated by execution of the convert and accumulate instruction can be stored within any desired register, in one embodiment the second source register is also used as the destination register for the fixed-point result value, and accordingly on execution of the convert and accumulate instruction, the input P-bit fixed-point operand will be overwritten by the result value generated by execution of the instruction.

In one embodiment, the apparatus may take the form of a SIMD (single instruction multiple data) apparatus. Accordingly, the execution circuitry may take the form of SIMD circuitry providing a plurality of lanes of parallel processing, where each lane has a width of P-bits. In such an embodiment, the convert and accumulate instruction may take the form of a SIMD instruction identifying, for each of multiple of the plurality of lanes, at least one floating-point operand to be converted into a corresponding N-bit fixed-point operand, and a P-bit fixed-point operand to which each of the corresponding N-bit fixed-point operands is to be accumulated.

Such an approach hence provides the potential for further performance improvements by allowing significant parallelisation of the accumulation of floating-point operands. In embodiments where the SIMD execution circuitry provides L lanes of parallel processing, the first and second source registers specified by the convert and accumulate instruction may be L×64-bit registers, and the convert and accumulate instruction identifies a first source register containing, for each of the L lanes, up to four 16-bit floating-point numbers. The execution circuitry is then responsive to the one or more control signals generated by the decoder circuitry in response to decoding the convert and accumulate instruction to perform, within each of the multiple lanes, conversion of each of the up to four 16-bit floating-point numbers into a corresponding fixed-point operand, and accumulation of each corresponding fixed-point operand and a 64-bit fixed-point operand contained within the second source register, in order to generate a 64-bit result value for inclusion within an L×64-bit result containing the result value from each lane. Hence, by such an approach, multiple result values can be captured within an L×64-bit result that can then be written to one of the registers accessible to the execution circuitry.

Multiple instances of such convert and accumulate instructions can be executed in order to perform accumulation of a large number of floating-point operands, with the result being represented in a fixed-point representation. Once the final result has been obtained, then in one embodiment the resultant fixed-point representation of the result can be converted back into a floating-point number of a desired floating-point format. For example, in one embodiment the sequence of instructions further comprises a fixed-point to floating-point conversion instruction which, when decoded by the decoder circuitry, causes the execution circuitry to convert a fixed-point result value, obtained by execution of one of more instances of the convert and accumulate instruction, into a floating-point result value having a floating-point format specified by the fixed-point to floating-point conversion instruction. It should be noted that the floating-point format into which the result is converted need not be the same floating-point format as the original input floating-point operands that were accumulated. For example, it may be that a sufficient number of 16-bit floating-point operands are accumulated using the above described techniques that the result value would no longer fit within a FP16 format, without performing a rounding operation. However, it may readily fit within an FP32 (32-bit floating-point) format for example, and accordingly the fixed-point to floating-point conversion instruction may convert the fixed-point result value into an FP32 value.

In one embodiment the input floating-point operands are in a standard floating-point representation. However, in an alternative embodiment, the at least one floating-point operand identified by the convert and accumulate instruction may comprise an unrounded product of a plurality of floating-point values. This will mean that the input floating-point representation has more bits than the standard floating-point representation. Nevertheless, the execution circuitry can convert that floating-point representation into a fixed-point representation of a suitable size, and then accumulate multiple instances of such converted values within a wider fixed-point representation. Alternatively, the fixed-point representation generated by the conversion process could be truncated prior to accumulation so as to avoid an increase in the number of bits used to represent the fixed-point accumulate value.

The execution circuitry can take a variety of forms. However, in one embodiment the execution circuitry comprises: conversion circuitry providing one or more conversion blocks, each conversion block arranged to receive an input floating-point operand identified by the convert and accumulate instruction and to generate the corresponding N-bit fixed-point operand; and accumulate circuitry to perform an accumulate operation to accumulate each corresponding N-bit fixed-point operand and said P-bit fixed-point operand in order to generate said P-bit fixed-point result value.

Each conversion block can take a variety of forms, but in one embodiment comprises: significand generation circuitry to generate a significand value from fraction bits of the input floating-point operand and a logical combination of exponent bits of the input floating-point operand; and shift circuitry, responsive to the input floating-point value being a normal floating-point value, to perform a left-shift operation on the significand value by a shift amount determined from an exponent value indicated by said exponent bits, in order to generate an output value. The output value can then be extended to a P-bit format prior to accumulation if desired.

The accumulation performed in response to the convert and accumulate instruction may involve the addition of the resultant converted fixed-point values to the P-bit fixed-point operand specified by the convert and accumulate instruction, but in other embodiments may involve either addition or subtraction. To enable the subtraction to be computed using addition circuits within the accumulate circuitry, in one embodiment each said conversion block further comprises: ones complement circuitry to perform a ones complement operation on the output value when a sign bit of the floating-point operand indicates that the input floating-point operand is a negative number. In such an embodiment, the sign bit of the floating-point operand may be used as a carry-in bit to the accumulate circuitry. Hence, if the floating-point operand is a positive number, a carry-in value of zero will be provided to the accumulate circuitry, whilst if the floating-point operand is a negative value, a carry-in bit of 1 will be provided to the accumulate circuitry.

The accumulate circuitry may be arranged in a variety of ways, but in one embodiment is arranged to perform twos complement addition of each corresponding N-bit fixed-point operand and said P-bit fixed-point operand in order to generate said P-bit fixed-point result value.

As mentioned earlier, in many embodiments it will be possible to accumulate a large number of converted floating-point operands within the P-bit fixed-point representation without any risk of overflow. However, in order to accommodate for situations where an overflow may potentially arise, the accumulate circuitry may in one embodiment include overflow detection circuitry to detect an overflow condition when a carry-in to a most significant bit position of the accumulate circuitry is unequal to a carry-out from that most significant bit position. A number of steps could be taken upon detection of an overflow. For example, in one embodiment an overflow exception could be signalled by the apparatus.

Particular embodiments will now be described with reference to the Figures.

Floating-point (FP) is a useful way of approximating real numbers using a small number of bits. The IEEE 754-2008 FP standard proposes multiple different formats for FP numbers, some of which are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| Format | Sign | Exponent | Fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1 \cdot \text{fraction} \times 2^e$$

where e is the true exponent computed from the biased exponent. The term 1·fraction is called the significand, and the 1 is not stored as part of the FP number, but is instead inferred from the exponent. All exponents except zero and the maximum exponent indicate a significand of the form 1·fraction. The exponent zero indicates a significand of the form 0·fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| Sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Some processors handle subnormals in hardware, speeding up these operations by a factor of, 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:
 +1=0001
 −1=1001

In two's complement representation, an n-bit integer it is represented by the low order n bits of the binary n+1-bit value $2^n+i$, so a 4-bit two's complement integer would represent plus and minus one as:
 +1=0001
 −1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

FP Number are not Real Numbers

It's tempting to think of FP numbers as being just like real numbers, but they are fundamentally different, even for the most basic properties:

1. They are not associative. For example, in SP we can add 3 numbers and return 1 million or zero, perhaps not what people think of as a rounding error:

$$(2^{45}+-2^{45})+2^{20}=2^{20}$$

$$2^{45}+(-2^{45}+2^{20})=0$$

2. They don't obey the distributive laws. Again in SP:

$$3,000,001*(4.00001+5.00001)=0x4bcdfe83$$

$$(3,000,001*4.00001)+(3,000,001*5.00001)=0x4bcdfe82$$

and things get even worse in the presence of overflow:

$$2^{50}*(2^{78}-2^{77})=2^{127}$$

$$(2^{50}*2^{78})-(2^{50}*2^{77})=\text{infinity}$$

3. Because of IEEE NaN rules, there are no multiplicative or additive identities. One and zero work as identities for numeric values.

One useful way to think of FP numbers is to consider them to be very long fixed-point numbers in which at most a few (11 for HP) consecutive bits can be nonzero. For example, non-infinite HP numbers can have the first bit of the significand in any of 30 places, and that first bit is followed by 10 other fraction bits, and there is a sign bit, so any finite HP number can be represented as a 30+10+1=41-bit fixed point number.

In accordance with the embodiments described hereafter, a convert and accumulate instruction is provided that, when executed by an apparatus, causes each of one or more floating-point operands identified by the convert and accumulate instruction to be converted into corresponding N-bit fixed-point operands having M fraction bits, where M is less than N and M is dependent on a format of the floating-point operand. Execution of the instruction further causes each of the resultant fixed-point operands to be accumulated with a P-bit fixed-point operand that is also identified by the convert and accumulate instruction, in order to generate a P-bit fixed-point result value, where P is greater and N and has M fraction bits. As will be clear from the following described embodiments, this provides a particularly fast and efficient mechanism for accumulating floating-point numbers in a manner that is associative, and hence enables reproducible and correct results to be generated irrespective of the order in which the floating-point numbers are accumulated.

FIG. 1 illustrates an apparatus in accordance with one embodiment. Decode circuitry 10 is arranged to receive a stream of instructions fetched from memory, and decodes each instruction in order to generate one or more control signals for controlling operations performed by the execution circuitry 20. The control signals generated by the decode circuitry are forwarded to the execution circuitry, optionally via an issue queue 15 where the various decoded instructions may temporarily reside prior to issuance to appropriate components within the execution circuitry. The execution circuitry can comprise a number of execution units, for example an arithmetic logic unit (ALU) for performing arithmetic operations, a floating-point unit (FPU) for performing floating-point operations, a multiply-accumulate (MAC) unit for performing multiply-accumulate operations, etc. The execution circuitry can also include components for converting floating-point numbers into a fixed-point representation, and similarly converting fixed-point numbers into a floating-point representation.

As will be discussed in more detail below, when the decoder circuitry 10 decodes one of the earlier-mentioned convert and accumulate instructions, this causes conversion circuitry 25 to be used to convert each of the one or more floating-point operands specified by that instruction into a corresponding fixed-point operand. Further, accumulate circuitry 30 (which could be provided within any suitable execution unit of the execution circuitry, for example the ALU) is then used to perform an accumulation operation using as inputs each of the fixed-point operands produced by the conversion circuitry 25 and a fixed-point operand identified by the convert and accumulate instruction, resulting in the generation of a fixed-point result value.

As shown in FIG. 1, the execution circuitry 20 has access to a set of working registers 35 in which source and destination operands can be stored. Hence, for example, in one embodiment the convert and accumulate instruction can specify one source register containing one or more floating-point operands that are to be converted into a fixed-point format, and also specify another source register containing the input fixed-point operand to be used in the accumulation operation. A separate destination register can also be specified if required, but in one embodiment the destination register is the same as the source register containing the input fixed-point operand.

FIG. 2A schematically illustrates the fields provided within the convert and accumulate instruction in accordance with one embodiment. In this example, it is assumed that the instruction only specifies a single input floating-point operand instead of specifying multiple input floating-point operands, and accordingly this variant of the instruction will be referred to as a scalar convert and accumulate instruction herein. The field 52 has a value indicating that the instruction is a scalar variant of the instruction, and the opcode 54 comprises a number of bits identifying the instruction as a convert and accumulate instruction. The field 56 specifies a source register within which the single floating-point operand is specified. Whilst in principle the floating-point operands can be in any floating-point format, for the embodiments described herein it will be assumed that the input floating-point operands are FP16 floating-point operands (also referred to herein as HP floating-point operands). The source register may be of any suitable size sufficient to store the floating-point operand. However, in one embodiment it is assumed that the registers within the register file 35 are 64-bit registers, and accordingly the FP16 value will be specified by a certain subset of the bits within the source register identified in the field 56. Typically it will be predetermined which subset of bits within the source register identify the FP16 value.

Field 58 identifies a second source register, containing a 64-bit fixed-point value. In one embodiment, this source register is also used as the destination register for the result produced as a result of performing the convert and accumulate operations.

As also shown in FIG. 2A, one or more optional fields 59 may be provided within the instruction, for example to identify condition codes specifying conditions which need to be present in order for the instruction to be executed.

As will be discussed in more detail later with reference to the remaining figures, when the convert and accumulate instruction is executed, the conversion circuitry 25 is used to convert the FP16 value specified in the source register 1 into a fixed-point format. In particular, in one embodiment, the FP16 value is converted into a 41-bit fixed-point value having 24 fraction bits. Any FP16 value can be converted into a fixed-point format represented within 41 bits. It is noted that this is significantly less than the 64 bits provided within the registers, and accordingly when the accumulation operation is performed to accumulate the resultant fixed-point representation of the FP16 value with the 64-bit fixed-point value specified in the source register 2, it is highly unlikely that an overflow will occur, unless the value in the source register 2 is already relatively close to the maximum value expressible in the 64-bit format. As will be discussed later, overflow detection circuitry can nevertheless be provided it desired to detect overflow conditions.

FIG. 2B illustrates an alternative form of the instruction where multiple input floating-point operands are specified within the first source register. Accordingly, this format of convert and accumulate instruction will be referred to herein as a vector convert and accumulate instruction, due to the vector of input floating-point values specified within the source register 1. In particular, in one embodiment the source registers are 64-bit registers, and hence in accordance with the vector variant of the instruction shown in FIG. 2B the field 66 identifies a source register containing four FP16 values.

Hence, the vector variant of the instruction 60 has the field 62 set to identify the instruction as a vector variant of the instruction, and the opcode in the field 64 identifies that the instruction is a convert and accumulate instruction, and identifies that four floating-point values are specified with the source register identified by the field 66. The field 68 is analogous to the field 58 of FIG. 2A, and identifies a 64-bit fixed-point value used as an input for the accumulate operation. Again, optional fields 69 be provided if desired, for example to specify condition codes.

It will be appreciated that other variants of the instruction could be provided. For example, another vector variant could be provided where the source register in the field 66 identifies more than one, but less than four, FP16 values, for example identifying two FP16 values. The opcode would then identify that the convert and accumulate instruction should operate on two FP16 values specified within the source register 1.

Figure 3:
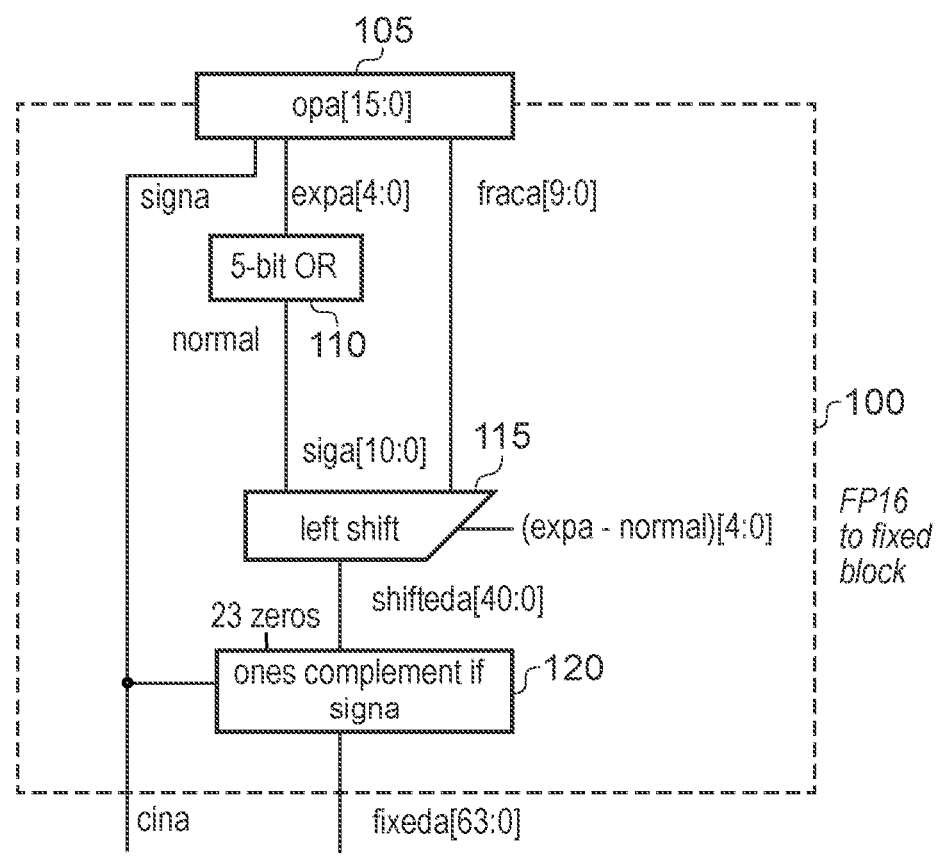
FIG. 3 illustrates a 16-bit floating point (FP16) to fixed-point conversion block in accordance with one embodiment.

FIG. 3 is a block diagram illustrating components that may be provided to implement a FP16 to fixed-point conversion block within the conversion circuitry 25 of FIG. 1.

This block operates on a single input FP16 value specified as operand A 105. As will be apparent from the earlier discussion of HP floating-point values, the FP16 operand will be a 16-bit value, where bit 15 is the sign bit, bits 14 to 10 provide an exponent value, and bits 9 to 0 identify the fraction portion. As shown in FIG. 3, the fraction portion is provided to the left shift circuitry 115, and the five exponent bits are subjected to a logical OR operation by the OR circuitry 110 in order to generate a single bit output. Assuming the floating-point value is a normal floating-point value, the output from the OR circuitry 110 will be a logic one value which, when prepended to the 10-bit fraction produces an 11-bit significand value input to the left shift circuitry 115. In the event that the floating-point operand is subnormal, then a logic zero value will be output from the OR circuitry 110 and prepended to the fractions bits to form the significand input to the left shift circuitry 115.

The left shift circuitry 115 is arranged, when the input floating-point value is a normal floating-point value, and accordingly the uppermost bit of the significand input to the left shift circuitry is set to a logic one value, to perform a left shift operation by an amount determined by subtracting from the exponent the normal value (i.e. 1) output from the OR gate 110. No left shift is performed for a subnormal floating-point input as the value "expa−normal" is zero. The maximum left shift amount that may be performed is 30 bits, and accordingly the output of the left shift circuitry is represented as a 41-bit value.

In the embodiment that will be described hereafter, the accumulation circuitry operates on 64-bit inputs, and accordingly the 41-bit output from the FP16 to fixed block 100 is in one embodiment sign-extended to 64 bits. One way to achieve this is to prepend 23 zeros to the output of the shifter 115 prior to input of the resultant 64-bit value into the ones complement circuitry 120.

If the sign of the input floating-point value is at a logic zero value, indicating that the floating-point value was a positive number, then no adjustment is made by the ones complement circuitry 120, and the input 64-bit value is output as the 64-bit value "fixeda". The sign bit is also output as a carry-in bit "cina" for the accumulate circuitry, and it will be understood that for a positive number the carry-in bit is hence zero. However, if the sign bit indicates that the floating-point number is negative, then a ones complement operation is performed by the circuitry 120 in order to generate a ones complement version of the input to that circuitry, with that ones complement version being output as the value fixeda. In this event, the carry-in value cina is set to a logic one value. By such an approach, it will be understood that the downstream accumulation circuitry can perform twos complement addition, and will correctly subtract the fixed-point representation of the floating-point number from the input fixed-point operand specified by the convert and accumulate instruction in the event that the floating-point operand was a negative number. Similarly, if the floating-point operand was a positive number, then the twos complement addition performed by the accumulate circuitry will correctly add the fixed-point representation of the floating-point number to the input fixed-point operand.

Figure 4:
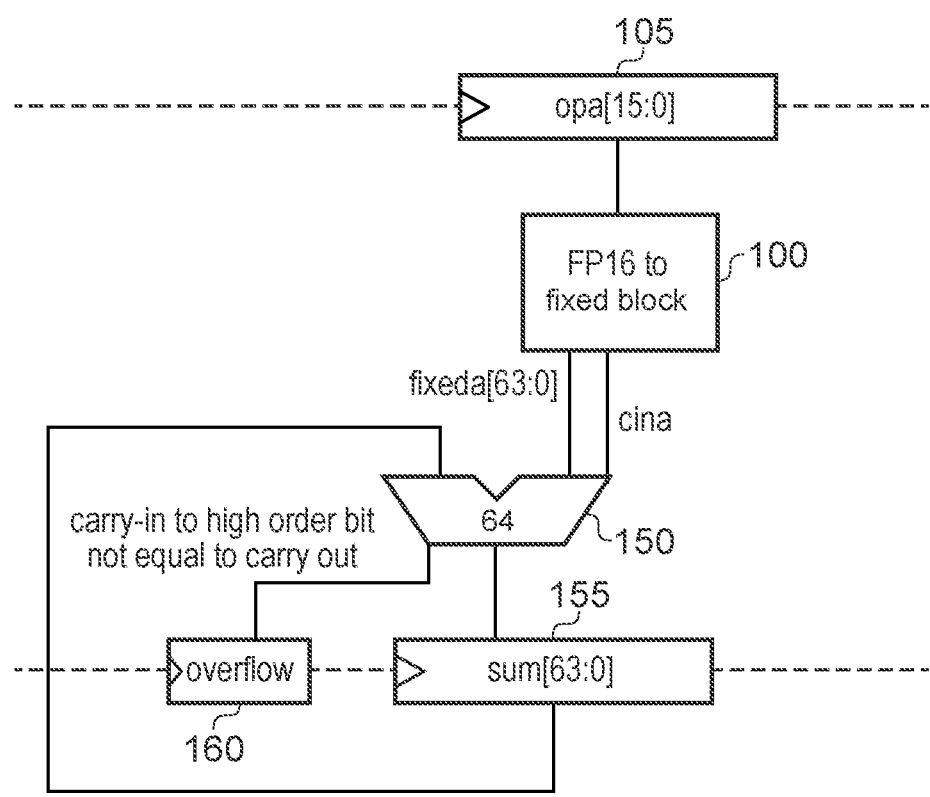
FIG. 4 illustrates how the FP16 to fixed-point conversion block of FIG. 3 may be connected to accumulate circuitry within the execution circuitry in accordance with one embodiment.

FIG. 4 is a block diagram illustrating how the FP16 to fixed block circuitry 100 shown in FIG. 3 can be coupled to accumulate circuitry in order to perform the conversion and accumulate operations required by the convert and accumulate instructions of the described embodiments. As shown in FIG. 4, the input floating-point operand 105 is provided to the FP16 to fixed block 100 which operates in the manner discussed earlier with reference to FIG. 3, and accordingly outputs a 64-bit value fixeda (which as mentioned earlier is merely a sign-extended version of the 41-bit fixed-point representation of the FP16 value), and the carry-in value cina. The fixeda value is provided as one input to the accumulator circuitry 150, which receives as its other input the 64-bit fixed-point operand specified by the convert and accumulate instruction. As discussed earlier, in one embodiment the source register 155 containing that value also serves as the destination register, and accordingly as shown in FIG. 4 the register 155 is also connected to the output of the accumulate circuitry 150. It will hence be appreciated that the accumulate circuitry 150 performs a twos complement addition of the two 64-bit input values, where for an addition the fixeda value will be representative of the zero-extended output from the left shift circuitry 115 and the carry-in bit will be zero, whereas for a subtraction the fixeda value will be the ones complement of the zero-extended output from the left shift circuitry 115, and the carry-in value will be set to one.

As mentioned earlier, since the fixed-point representation of an FP16 floating-point value can be represented in 41 bits, many FP16 values can be accumulated within a 64-bit wide fixed-point representation. In particular, $2^{23}$ of such numbers can be accumulated within a 64-bit fixed-point representation without any danger of overflow. However, overflow detection can be readily provided by providing an overflow flag 160 which is set if the carry-in to the high order bit of the 64-bit accumulator 150 is not equal to the carry-out from that high order bit position. When the overflow flag 160 is set, an action can be triggered within the apparatus to deal with the overflow. For example, in one embodiment an overflow exception could be raised.

Whilst in one embodiment each floating-point operand identified by the convert and accumulate instruction is in a standard floating-point format, in an alternative embodiment each floating-point operand may be in a non-standard format, and in particular for example may comprise an unrounded product of a plurality of floating-point values. When in such an unrounded form, the input floating-point operand will comprise more bits of information. Accordingly, when those floating-point bits are converted into a fixed-point form, the fixed-point representation will also typically comprise more bits. In one embodiment this can be accommodated by having wider data paths in the floating-point to fixed-point conversion block to accommodate the additional fraction bits provided within the floating-point format, along with larger potential left shift amounts supported by the left shift circuitry. This may then potentially require larger accumulate widths to be supported, for example greater than 64 bits. However, in an alternative embodiment, the output of the floating-point to fixed-point conversion block could be truncated so that the output is reduced to a range of interest, and can then still be accumulated within the standard processing width, for example a 64-bit width.

Figure 5:
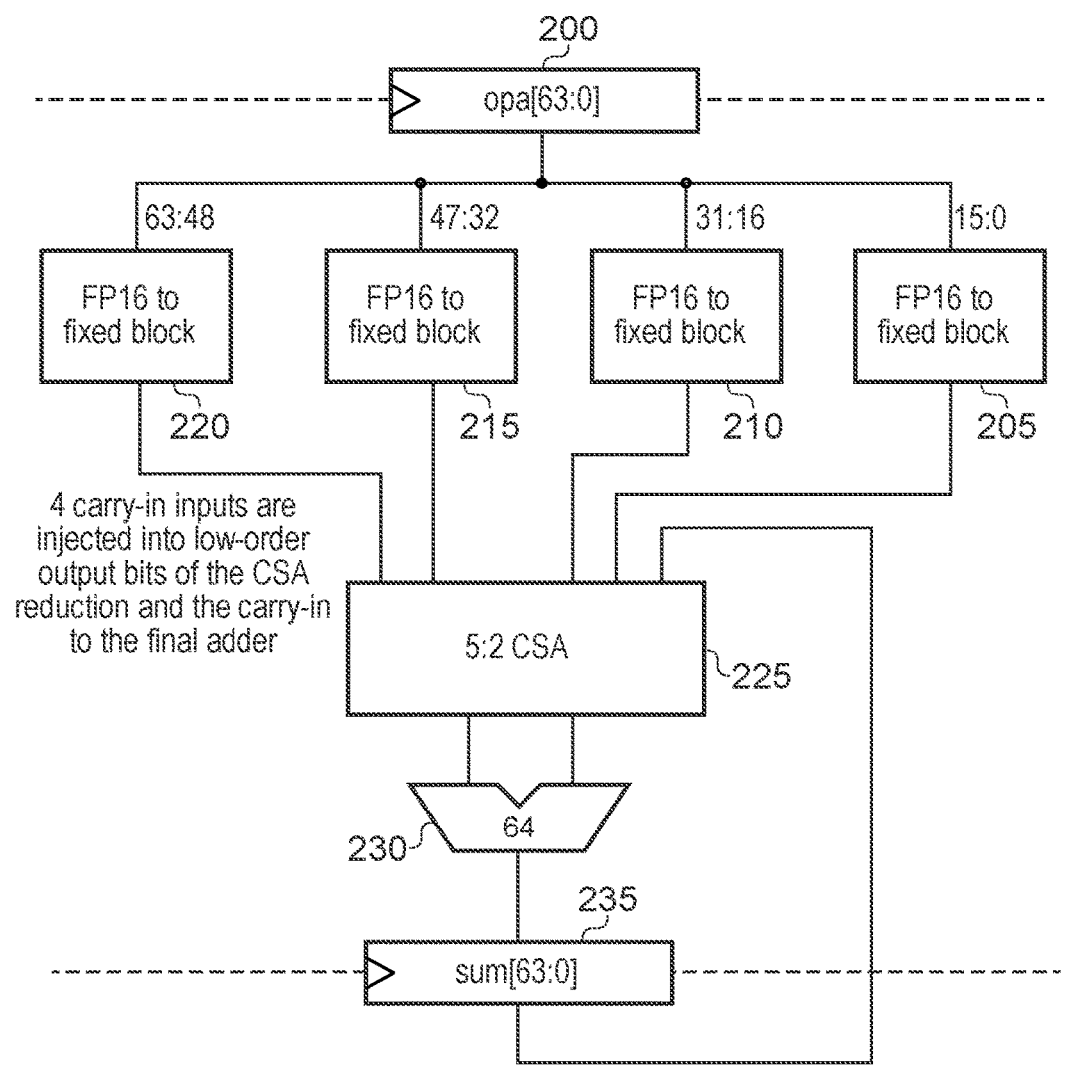
FIG. 5 is a diagram illustrating how multiple FP16 to fixed-point conversion blocks may be connected to accumulate circuitry in one embodiment to enable multiple floating-point values to be accumulated in response to a single convert and accumulate instruction.

FIG. 5 is a block diagram illustrating how multiple FP16 to fixed-point conversion blocks such as discussed earlier with reference to FIG. 3 can be used in parallel to convert multiple floating-point operands specified by a single instance of the convert and accumulate instruction. In particular, when using the earlier-described vector convert and accumulate instruction of FIG. 2B, four FP16 to fixed-point conversion blocks 205, 210, 215, 220 can be provided, each being arranged to receive a 16-bit portion of the data specified in the first source register 200. In particular, that 64-bit source register 200 will in that event contain four 16-bit floating-point operands, and each floating-point operand can be provided to one of the FP16 to fixed-point conversion blocks. Those blocks will then generate a 41-bit fixed-point representation of each floating-point number, which as discussed earlier in one embodiment will be sign-extended to 64 bits, prior to output to the accumulate circuitry. In this instance, the accumulate circuitry includes a 5:2 carry save adder 225 which receives the outputs from the four FP16 to fixed-point conversion blocks 205, 210, 215, 220, and also receives the 64-bit fixed-point input operand from the second source register 235. The carry-save adder operates in the standard manner to reduce the inputs to a form that can be provided to the 64-bit accumulator 230 in order to produce a final 64-bit accumulate result. Since the destination register is specified to be the same as the second source register, then as shown in FIG. 5 that output is written back to the register 235.

As noted in FIG. 5, the four carry-in inputs (one being produced by each of the FP16 to fixed-point conversion blocks 205, 210, 215, 220) are injected into low-order carry bits that are always zero in the carry-save adder reduction and the carry-in to the final adder.

By using the circuitry of FIG. 5, this enables a single instruction to specify four FP16 values packed into a 64-bit word, and for these to be converted into a fixed-point representation and then added to a fixed-point number within a single cycle.

Figure 6:
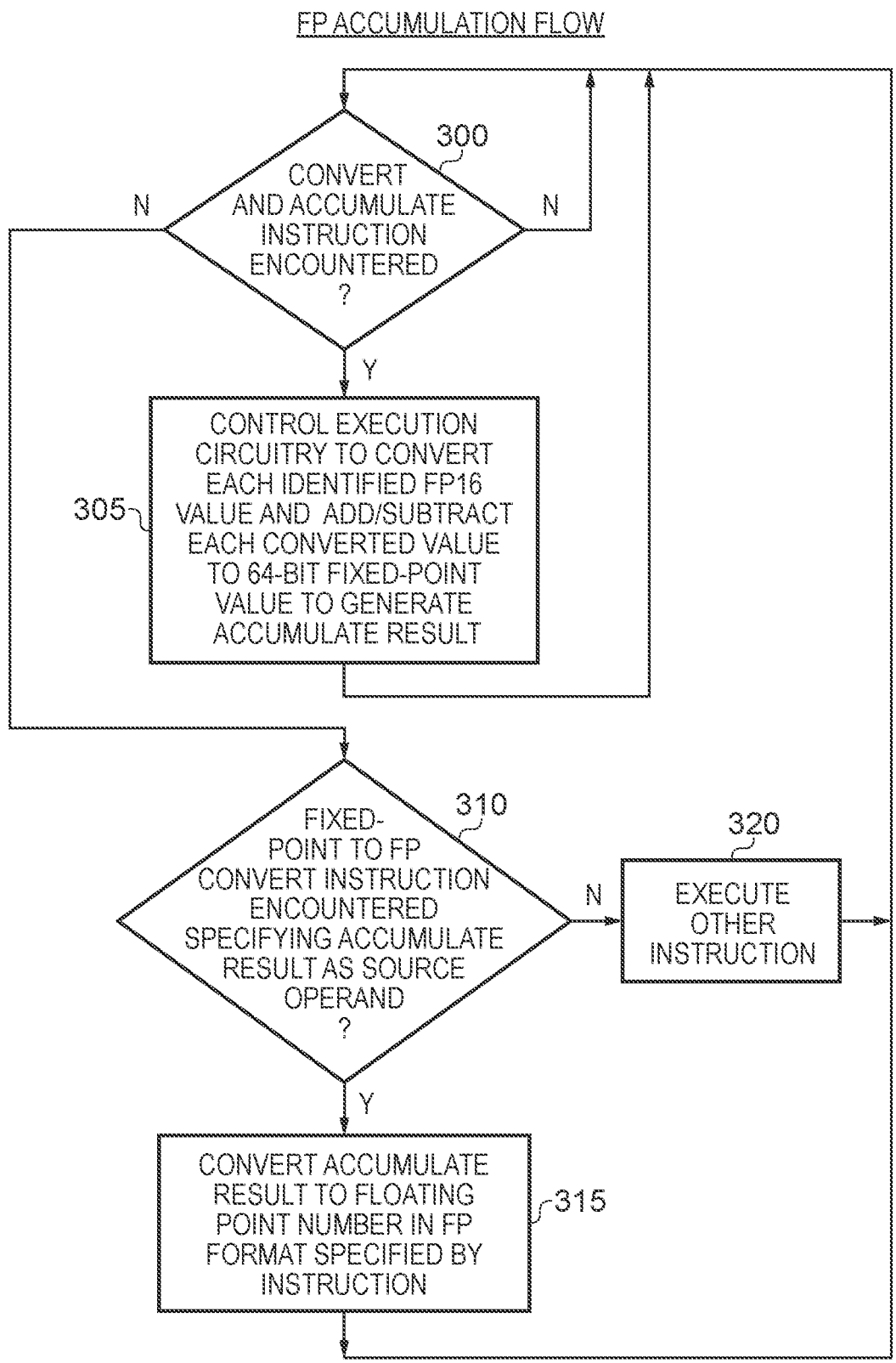
FIG. 6 is a flow diagram illustrating a floating-point accumulation operation performed in accordance with one embodiment through use of one or more instances of the convert and accumulate instruction, along with a fixed-point to floating-point conversion instruction to convert the final result value back to floating-point format.

FIG. 6 is a flow diagram illustrating a process that may be performed in accordance with one embodiment to accumulate a series of floating-point operands using one or more instances of the convert and accumulate instructions described earlier. At step 300, it is determined whether a current instruction is a convert and accumulate instruction. If it is then, that instruction is decoded by the decoder circuitry 10 to produce control signals that at step 305 control the execution circuitry 20 to convert each identified FP16 value into a fixed-point representation and then to add or subtract each converted value to the 64-bit fixed-point value also specified as an operand by the instruction, to thereby generate an accumulate result. The process then returns to step 300. If at step 300 it is determined that the current instruction is not a convert and accumulate instruction, it is determined at step 310 if that instruction is a fixed-point to floating-point convert instruction that specifies the accumulate result as a source operand. In particular, once one or more instances of the convert and accumulate instruction have been executed, each using the same second source register so as to enable a series of floating-point operands to be accumulated together via execution of multiple instances of the convert and accumulate instruction, it may be desired to convert the generated accumulate result back into a floating-point format. This can be achieved by the use of such a fixed-point to floating-point convert instruction, which will typically specify the floating-point format to be used for the result.

Accordingly, if a fixed-point to floating-point convert instruction is encountered at step 310, then at step 315 the accumulate result is converted into a floating-point number in the floating-point format specified by the instruction. The process then returns to step 300. If at step 310, it is determined that the current instruction is not a fixed-point to floating-point convert instruction, then, as captured generically by the box 320, the instruction is not an instruction used for performing floating-point accumulation, and is merely executed in the standard way. At step 320, the instruction could hence be any other instruction in the program sequence. Thereafter the process returns to step 300.

Figure 7:
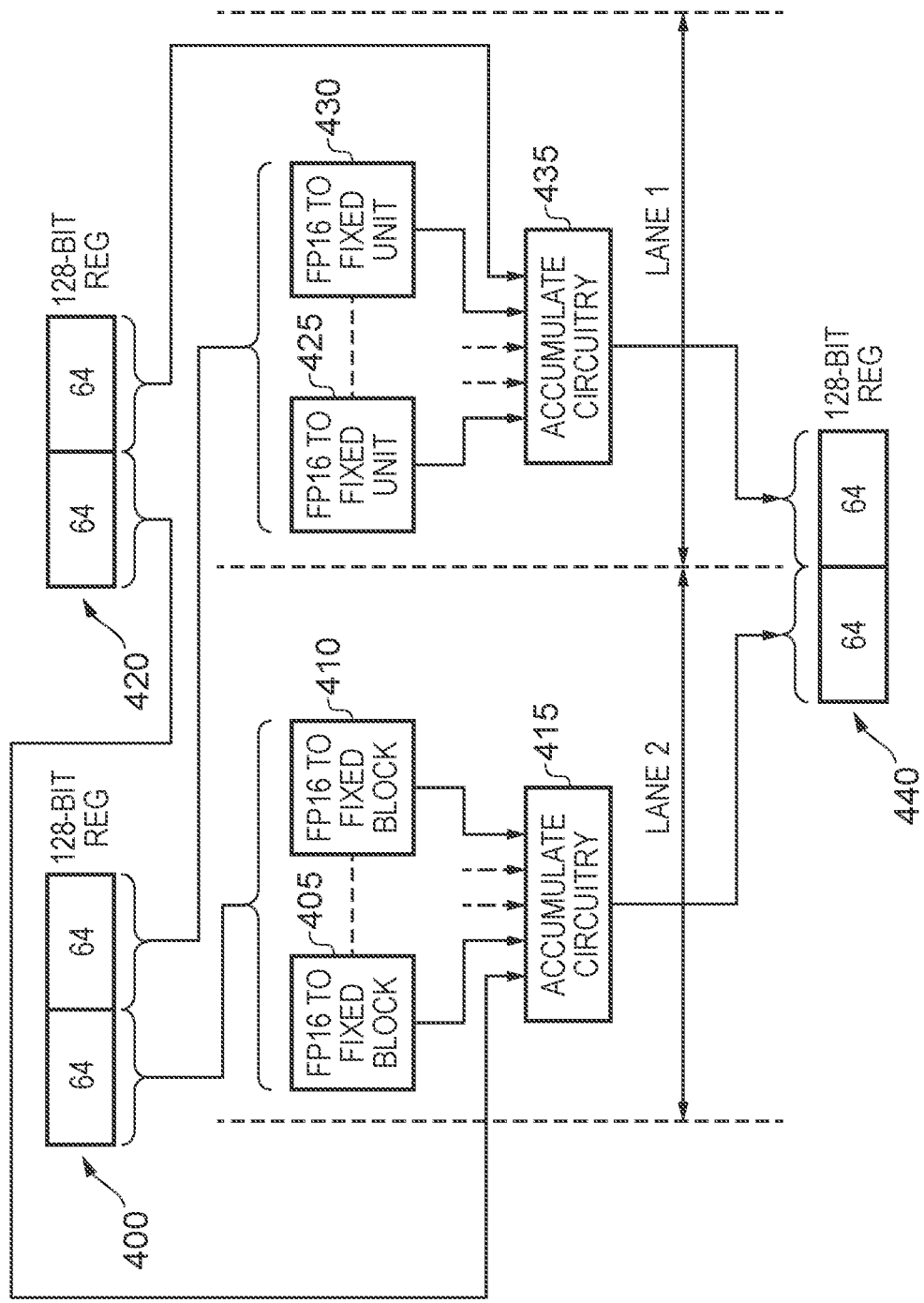
FIG. 7 illustrates a SIMD implementation according to one embodiment.

In an alternative embodiment, as illustrated schematically in FIG. 7, the apparatus may have a SIMD architecture, where the execution circuitry identifies multiple lanes of parallel processing, and the convert and accumulate instructions can take the form of SIMD instructions. In particular, within each of the lanes of parallel processing, the above-described conversion and accumulate operations can be performed independently in parallel. In the example shown in FIG. 7, it is assumed that the SIMD execution circuitry has two lanes of parallel processing, but it will be appreciated that in other SIMD arrangements more than two lanes may be provided.

The basic instruction format for SIMD variants of the convert and accumulate instructions are similar to that discussed earlier with reference to FIGS. 2A and 2B. However, the opcodes will identify the instructions as being SIMD instructions and each of the source registers may be L×64-bit registers, where L is the number of lanes of parallel processing. Hence, in the example of FIG. 7, each of the source registers may be 128-bit registers, each register containing two 64-bit portions. Assuming the variant of FIG. 2B is used, each 64-bit portion of the 128-bit first source register will identify four FP16 values. Similarly, each 64-bit portion of the second source register will contain a 64-bit accumulate value. These two source registers are illustrated schematically in FIG. 7 by the elements 400, 420 respectively. With regard to the optional fields, in addition to the optional fields that may be provided for non-SIMD variants of the instructions, for SIMD variants a predicate value may be specified to identify which lanes are active, and accordingly within which lanes the processing is required to be performed. For example, in a SIMD architecture having four lanes, it may be desired to perform the convert and accumulate operations within a certain subset of the lanes, for example lanes 1, 3 and 4, but not to perform any processing within lane 2, and this can be indicated by use of such a predicate value.

As shown in FIG. 7, within each lane, circuitry equivalent to that discussed earlier with reference to FIG. 5 is provided. Accordingly, within lane 2 there will be a plurality of FP16 to fixed-point conversion blocks 405, 410, which all feed into accumulate circuitry 415. In the instance where there are four FP16 to fixed-point conversion blocks then the accumulate circuitry 415 will include the 5:2 carry-save adder 225 and adder circuit 230 shown in FIG. 5. Similarly, within lane 1 a plurality of FP16 to fixed-point conversion units 425, 430 are provided, along with associated accumulate circuitry 435. Considering the first source register 400, a first 64-bit portion is routed into lane 1 and a second 64-bit portion is routed into lane 2. Within the individual lanes, the individual FP16 values within the 64-bit portion are routed to respective FP16 to fixed-point conversion blocks 405, 410 or 425, 430. Similarly, with regard to the second source register 420 including the two 64-bit fixed-point input operands, the first of those fixed-point operands will be provided to the accumulate circuitry 435 in lane 1, whilst the other is provided to the accumulate circuitry 415 in lane 2.

Accordingly, it can be seen that within each lane the processing discussed earlier with reference to FIG. 5 is performed, resulting in the output of two 64-bit accumulate results that can then be captured collectively within the destination register 440. As discussed earlier, in one embodiment the destination register 440 will actually be the same as the second source register 420, and accordingly the two accumulate results produced will overwrite the previous contents of the second source register.

By adopting such a SIMD approach, this provides potential for further performance improvements by allowing significant parallelisation of the accumulation of floating-point operands.

Through use of the approach of the described embodiments, it is possible to provide a fast and efficient mechanism for accumulating floating-point values in a manner that is associative, and accordingly the accumulations can be done in any order, and are completely reproducible. The speed and accuracy of this approach offers significant advantages when compared with seeking to accumulate floating-point values using floating-point arithmetic, and will hence provide significant benefits in a variety of practical applications. For example, such an approach would be particularly beneficial when processing deep learning problems. The arithmetic of deep learning is fundamentally matrix multiplication (GEMM), and so it reduces to a huge number of sums of products. By adopting the techniques described herein, a large number of floating-point operands, for example FP16 operands, can be accumulated in a way that is entirely deterministic, irrespective of the order in which the accumulations take place. The approach lends itself to parallelism, providing significant performance improvements to be realised.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
execution circuitry to perform arithmetic operations, the execution circuitry comprising conversion circuitry and accumulate circuitry; and
decoder circuitry to decode a sequence of instructions in order to generate control signals to control the arithmetic operations performed by the execution circuitry;
the decoder circuitry being responsive to decoding a convert and accumulate instruction within the sequence to generate one or more control signals to control the conversion circuitry to convert at least one floating-point operand identified by the convert and accumulate instruction into a corresponding N-bit fixed-point operand having M fraction bits, where M is less than N and M is dependent on a format of the floating-point operand, and to control the accumulate circuitry to accumulate each corresponding N-bit fixed-point operand and a P-bit fixed-point operand identified by the convert and accumulate instruction in order to generate a P-bit fixed-point result value, where P is greater than N and has M fraction bits; and
a set of registers accessible to the execution circuitry when performing said arithmetic operations;
wherein the convert and accumulate instruction has a first register identifier field identifying at least one first source register within said set of registers, said at least one first source register containing said at least one floating-point operand, and a second register identifier field identifying a second source register within said set of registers, said second source register containing said P-bit fixed-point operand.

2. An apparatus as claimed in claim 1, wherein each of said at least one floating-point operand identified by the convert and accumulate instruction is a 16-bit floating-point operand.

3. An apparatus as claimed in claim 2, wherein the execution circuitry is arranged to convert said at least one floating-point operand identified by the convert and accumulate instruction into a corresponding 41-bit fixed-point operand having 24 fraction bits.

4. An apparatus as claimed in claim 1, wherein the P-bit fixed-point operand identified by the convert and accumulate instruction is a 64-bit fixed-point operand.

5. An apparatus as claimed in claim 1, wherein the execution circuitry is arranged to output for storage in the second source register said P-bit fixed-point result value.

6. An apparatus as claimed in claim 1, wherein the at least one first source register and the second source registers are 64-bit registers, and the convert and accumulate instruction identifies a source register of the at least one first source register containing up to four 16-bit floating-point numbers, the execution circuitry being responsive to the one or more control signals generated by the decoder circuitry in response to decoding the convert and accumulate instruction to convert each of the up to four 16-bit floating-point numbers into a corresponding fixed-point operand, and to accumulate each corresponding fixed-point operand and a 64-bit fixed-point operand contained within the second source register, in order to generate a 64-bit result value.

7. An apparatus as claimed in claim 1, wherein the execution circuitry is SIMD (Single Instruction Multiple Data) circuitry providing a plurality of lanes of parallel processing, each lane having a width of P bits, and the convert and accumulate instruction is a SIMD instruction identifying, for each of multiple of said plurality of lanes, at least one floating-point operand to be converted into a corresponding N-bit fixed-point operand, and a P-bit fixed-point operand to which each of said corresponding N-bit fixed-point operands is to be accumulated.

8. An apparatus as claimed in claim 1, wherein:
the execution circuitry is SIMD (Single Instruction Multiple Data) circuitry providing L lanes of parallel processing, each lane having a width of P bits, and the convert and accumulate instruction is a SIMD instruction identifying, for each of multiple of said L lanes, at least one floating-point operand to be converted into a corresponding N-bit fixed-point operand, and a P-bit fixed-point operand to which each of said corresponding N-bit fixed-point operands is to be accumulated;
the first and second source registers are L×64-bit registers, and the convert and accumulate instruction identifies a first source register containing, for each of the L lanes, up to four 16-bit floating-point numbers, the execution circuitry being responsive to the one or more control signals generated by the decoder circuitry in response to decoding the convert and accumulate instruction to perform, within each of the multiple lanes, conversion of each of the up to four 16-bit floating-point numbers into a corresponding fixed-point operand, and accumulation of each corresponding fixed-point operand and a 64-bit fixed-point operand contained within the second source register, in order to generate a 64-bit result value for inclusion within an Lx64-bit result containing a result value from each lane.

9. An apparatus as claimed in claim 1, wherein the sequence of instructions further comprises a fixed-point to floating-point conversion instruction which, when decoded by the decoder circuitry, causes the execution circuitry to convert a fixed-point result value, obtained by execution of one of more instances of the convert and accumulate instruction, into a floating-point result value having a floating-point format specified by the fixed-point to floating-point conversion instruction.

10. An apparatus as claimed in claim 1, wherein said at least one floating-point operand identified by the convert and accumulate instruction comprises an unrounded product of a plurality of floating-point values.

11. An apparatus as claimed in claim 1, wherein
the conversion circuitry provides one or more conversion blocks, each conversion block arranged to receive an input floating-point operand identified by the convert and accumulate instruction and to generate the corresponding N-bit fixed-point operand; and
the accumulate circuitry performs an accumulate operation to accumulate each corresponding N-bit fixed-point operand and said P-bit fixed-point operand in order to generate said P-bit fixed-point result value.

12. An apparatus as claimed in claim 11, wherein each said conversion block comprises:
significand generation circuitry to generate a significand value from fraction bits of the input floating-point operand and a logical combination of exponent bits of the input floating-point operand; and
shift circuitry, responsive to the input floating-point value being a normal floating-point value, to perform a left-shift operation on the significand value by a shift amount determined from an exponent value indicated by said exponent bits, in order to generate an output value.

13. An apparatus as claimed in claim 12, wherein each said conversion block further comprises:
ones complement circuitry to perform a ones complement operation on the output value when a sign bit of the floating-point operand indicates that the input floating-point operand is a negative number.

14. An apparatus as claimed in claim 12, wherein a sign bit of the floating-point operand is used as a carry-in bit to the accumulate circuitry.

15. An apparatus as claimed in claim 11, wherein the accumulate circuitry is arranged to perform twos complement addition of each corresponding N-bit fixed-point operand and said P-bit fixed-point operand in order to generate said P-bit fixed-point result value.

16. An apparatus as claimed in claim 11, wherein said accumulate circuitry includes overflow detection circuitry to detect an overflow condition when a carry-in to a most significant bit position of the accumulate circuitry is unequal to a carry-out from that most significant bit position.

17. A method of performing accumulation of floating-point numbers within an apparatus having execution circuitry comprising conversion circuitry and accumulate circuitry to perform arithmetic operations, decoder circuitry to decode a sequence of instructions in order to generate control signals to control the arithmetic operations performed by the execution circuitry, and a set of registers accessible to the execution circuitry when performing said arithmetic operations, the method comprising:
decoding within the decoder circuitry a convert and accumulate instruction within the sequence to generate one or more control signals; and
controlling the conversion circuitry in response to said one or more control signals to convert at least one floating-point operand identified by the convert and accumulate instruction into a corresponding N-bit fixed-point operand having M fraction bits, where M is less than N and M is dependent on a format of the floating-point operand, and to control the accumulate circuitry to accumulate each corresponding N-bit fixed-point operand and a P-bit fixed-point operand identified by the convert and accumulate instruction in order to generate a P-bit fixed-point result value, where P is greater than N and has M fraction bits;
wherein the convert and accumulate instruction has a first register identifier field identifying at least one first source register within a set of registers, said at least one first source register containing said at least one floating-point operand, and a second register identifier field identifying a second source register within said set of registers, said second source register containing said P-bit fixed-point operand.

18. An apparatus comprising:
execution means for performing arithmetic operations, the execution means comprising a conversion means and an accumulate means; and
decoder means for decoding a sequence of instructions in order to generate control signals to control the arithmetic operations performed by the execution means;
the decoder means for decoding a convert and accumulate instruction within the sequence in order to generate one or more control signals;
the conversion means for converting, in response to said one or more control signals, at least one floating-point operand identified by the convert and accumulate instruction into a corresponding N-bit fixed-point operand having M fraction bits, where M is less than N and M is dependent on a format of the floating-point operand, and the accumulate means for accumulating each corresponding N-bit fixed-point operand and a P-bit fixed-point operand identified by the convert and accumulate instruction in order to generate a P-bit fixed-point result value, where P is greater than N and has M fraction bits; and
a set of registers accessible to the execution circuitry when performing said arithmetic operations;
wherein the convert and accumulate instruction has a first register identifier field identifying at least one first source register within said set of registers, said at least one first source register containing said at least one floating-point operand, and a second register identifier field identifying a second source register within said set of registers, said second source register containing said P-bit fixed-point operand.

* * * * *